United States Patent
Junqua et al.

[19]

[11] Patent Number: 5,930,336
[45] Date of Patent: *Jul. 27, 1999

[54] VOICE DIALING SERVER FOR BRANCH EXCHANGE TELEPHONE SYSTEMS

[75] Inventors: Jean-Claude Junqua; Philippe R. Morin; Ted H. Applebaum, all of Santa Barbara, Calif.

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/723,914

[22] Filed: Sep. 30, 1996

[51] Int. Cl.⁶ .................................................. H04M 1/64
[52] U.S. Cl. ...................... 379/88.03; 379/201; 379/210; 379/216
[58] Field of Search .................................. 379/67, 88, 89, 379/201, 210, 216, 355, 356, 88.01, 88.03

[56] References Cited

U.S. PATENT DOCUMENTS

| | | |
|---|---|---|
| H1646 | 5/1997 | Kato et al. .............................. 379/355 |
| 4,878,240 | 10/1989 | Lin et al. .................................. 379/67 |
| 4,893,335 | 1/1990 | Fuller et al. ............................ 379/200 |
| 5,274,695 | 12/1993 | Green ........................................ 379/201 |
| 5,369,685 | 11/1994 | Kero ........................................... 379/67 |
| 5,590,186 | 12/1996 | Liao et al. .............................. 379/210 |
| 5,684,925 | 11/1997 | Morin et al. ............................ 704/254 |

*Primary Examiner*—Daniel S. Hunter
*Attorney, Agent, or Firm*—Harness, Dickey & Pierce, P.L.C.

[57] ABSTRACT

The voice dialing server plugs into one or more unused extensions of a branch exchange system to provide each of the users on the system with voice dialing services. To use the system a user simply dials the extension to which the server is attached. The server then prompts the user to supply the name of a party to be called. The name is then looked up in a telephone number dictionary unique to that user. The system then places the telephone call by sending commands to the branch exchange system that simulate the operations a user would perform to connect to an outside line or inside extension and then place the call. The server incorporates a speech processing module having a multistage word recognizer that represents speech in terms of high phoneme similarity values. This representation is highly compact, allowing the word recognizer to perform the recognizer and fine match stages with far less processor overhead than frame-by-frame speech recognizers.

12 Claims, 9 Drawing Sheets

FIGURE 5
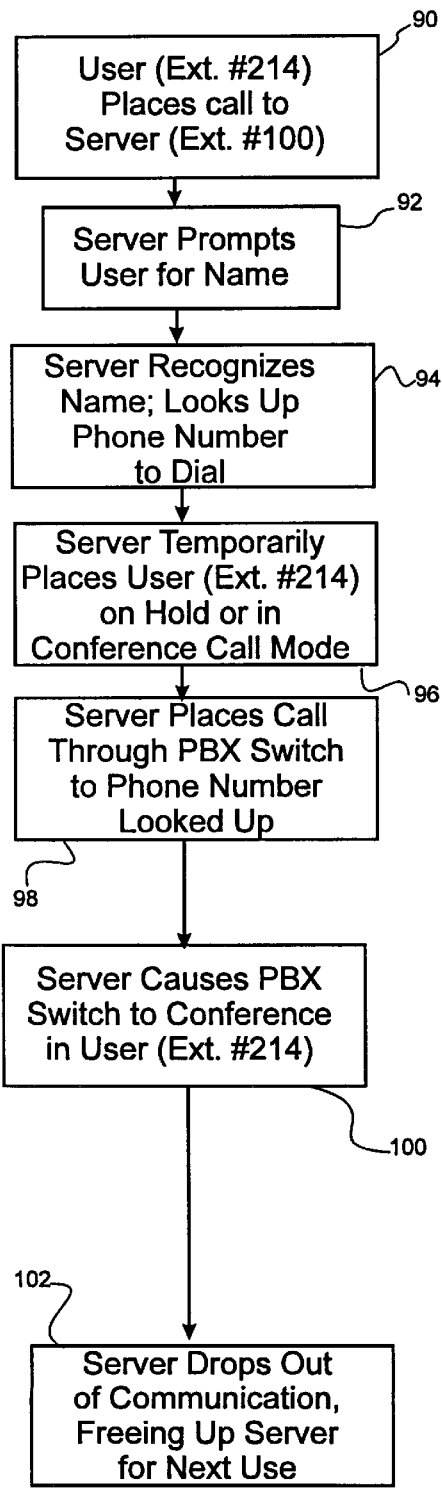
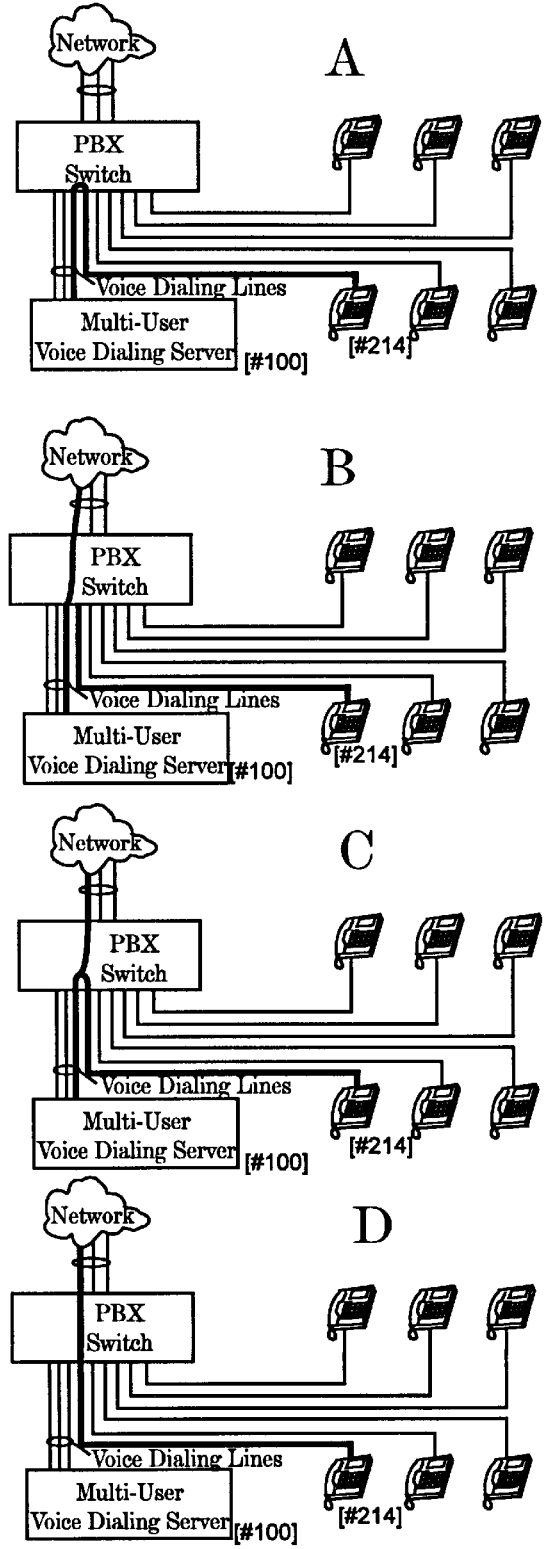

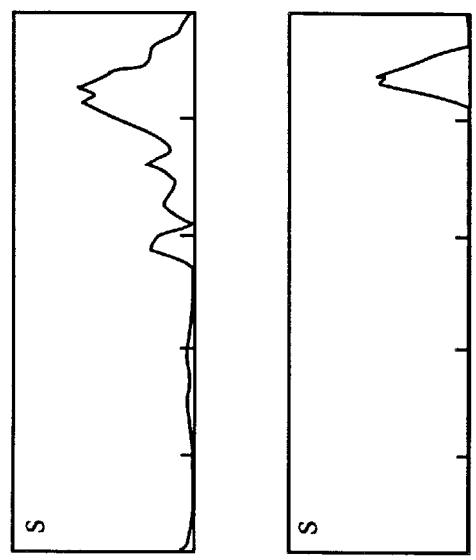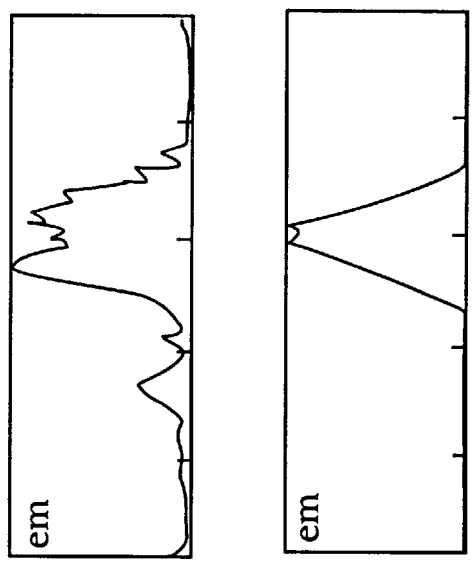
Similarity Values → High Similarity Regions
Figure 7

5,930,336

VOICE DIALING SERVER FOR BRANCH EXCHANGE TELEPHONE SYSTEMS

BACKGROUND AND SUMMARY OF THE INVENTION

The present invention relates generally to telephone switching equipment. More particularly the invention relates to a voice dialing server that attaches to the telephone branch exchange equipment to provide voice dialing services without the need to extensively modify the branch exchange equipment. The preferred system plugs into one or more unused extensions of the branch exchange system to provide voice dialing services for multiple users of the system. Each user may have his or her own dictionary of names and phone numbers. The system integrates with the existing branch exchange network, using the existing voice and control channels to cause the existing branch exchange system to perform the necessary switching operations.

Voice dialing promises to make telephones easier to use, by allowing the user to simply speak a name and then have the voice dialing system look up the telephone number of the named party and automatically place the call. In the cellular telephone market, rudimentary voice dialing systems have been experimented with to provide hands-free operation. The primary technological focus in the cellular telephone market has been on how to overcome the high ambient noise level present in the cellular telephone environment, particularly in car phone applications. There has also been some work in developing voice dialing units for the home. These units typically connect between the telephone and the outside telephone line. A primary technological focus of those units has been on how to overcome the presence of the dial tone when the user lifts the handset to use the voice dialer.

While voice dialing has made some inroads, particularly in the applications discussed above, voice dialing has yet to be incorporated into more complex telephone systems such as private branch exchange switching systems (PBX systems). There are a number of reasons for this. First, voice recognition is a challenging problem and current technology does not provide suitable recognition accuracy in an economical configuration. For example, the complex Hidden Markov Model-based systems employed by state-of-the-art speech recognizers (as in dictation transcription systems) require lots of memory and computational power.

Second, in the voice dialing application, the voice recognition problem is compounded where the system must be adapted for use by a large number of users. The need to respond to the spoken commands of a large number of users makes the voice dialing problem far more difficult than it is for simple voice dialing systems designed for home use.

Third, it is not a simple matter to integrate voice dialing into a complex telephone switching network. Modern-day telephone switching networks employ an intricate labyrinth of digital control signals that effect various switching functions (e.g. placing a call on hold, transferring a call, initiating a conference call, reassigning an extension to a different location and so forth). Simple voice dialing systems of the type employed in cellular phone applications or home dialing applications will not work in this more complex environment.

Finally, office PBX equipment is expensive and difficult to replace without disrupting day-to-day office functions. Thus many businesses that would benefit from voice dialing services, were such equipment available, simply cannot afford the cost and down-time required to replace that equipment with newer equipment providing voice dialing capabilities.

Thus, while the desirability of providing voice dialing in office systems is readily appreciated, current technology does not provide the means to accomplish it.

The present invention provides a voice dialing server for coupling to a branch exchange telephone system of the type that provides call switching among a plurality of telephone extension ports. The system is designed for plug-compatible connection to the existing telephone system without the need for modifying the system extensively. The voice dialing server has an interface for connection to at least one of the telephone extension ports of the existing telephone system. The interface supports transmission of voice signals and telephone system control information.

The voice dialing server also includes a speech processing module coupled to the interface for providing the following services. The speech processing module answers calls placed to the voice dialing server by users of the system. It processes speech input from the user, corresponding to a selected party to be called; and it looks up the telephone number of the selected party.

The voice dialing system also includes a branch exchange control module that is coupled to the interface and to the speech processing module. The control module issues control information to the telephone system, causing the telephone system to connect the user's extension to an outside line while dialing the phone number of the selected party. The preferred embodiment causes the extension that has been assigned to the interface to be connected to a second telephone port on the system. The second port can be another extension or an outside line. Then the call is placed via the second port and the user's extension is then attached to the second port. In this way the user is placed in communication with the selected party.

The system integrates fully with the existing branch exchange telephone system. Thus the invention can be readily added to an existing telephone system, simply by plugging it into an unused extension port on the system. To use the system the user simply dials the extension assigned to the voice dialing server and follows the voice prompts issued by the server. The system is preferably implemented in a multitasking environment that allows multiple threads to run concurrently. Thus multiple users may use the system simultaneously. The system is capable of providing different phone directories for different users, and these may be automatically associated with the users' telephone extension. The system is able to determine the extension of the user. By determining the user's extension the voice dialing server automatically uses the phone number dictionary created by the user at that extension. Alteratively, the user can override the determined extension by supplying a different extension, thereby causing a different phone number dictionary to be used.

Although well integrated into the existing telephone system architecture, the invention can also be used by callers outside the system to reach persons inside the system or to look up numbers from the telephone book. For example, a user calling from home may connect to the voice dialing server by specifying the server's extension. Then, the user may enter his or her office telephone extension number, thereby telling the voice dialing server that the phone number dictionary assigned to the office extension should be used. Thereafter, the user calling from home can use his or her office telephone number directory just as if the user were from the office.

The voice dialing server uses very fast and yet remarkably accurate voice recognition technology based on reliably detected phoneme similarity regions. The preferred embodiment uses a multistage word recognizer that compactly represents speech in terms of high phoneme similarity values. This is a departure from conventional techniques that determine similarity based on a frame-by-frame alignment. The preferred embodiment uses a word recognizer that preserves only the interesting regions of high phoneme similarity or features. A word recognizer is used to narrow the search so that the subsequent fine match stage is able to perform its task more quickly. The word recognizer and fine match stages share the initial representation of speech as a sequence of multiple phoneme similarity values. By representing speech as features at a lower data rate in the initial stage of recognition, the complexity of the matching procedure is greatly reduced.

For a more complete understanding of the invention, its objects and advantages, reference may be had to the following specification and to the accompanying drawings.

BRIEF DESCRIPTION OF THE DRAWINGS

FIG. 5 is a flowchart with accompanying signal flow diagrams, showing how the PBX control functions are performed;

FIG. 7 is a series of graphs showing the output of the region picking procedure whereby similarity values are converted into high similarity regions;

DESCRIPTION OF THE PREFERRED EMBODIMENTS

The present voice dialing server is designed to connect to an existing telephone system of the type found in small, medium and large businesses, institutions, hotels, offices and the like. For purposes of illustrating the invention the existing telephone system will be illustrated and described as a private branch exchange system or PBX system. As will be appreciated from the following description, the invention is not limited to any particular type of telephone switching system. Hence the reference to private branch exchange or PBX systems in this written description is not intended to limit the invention.

Figure 1:
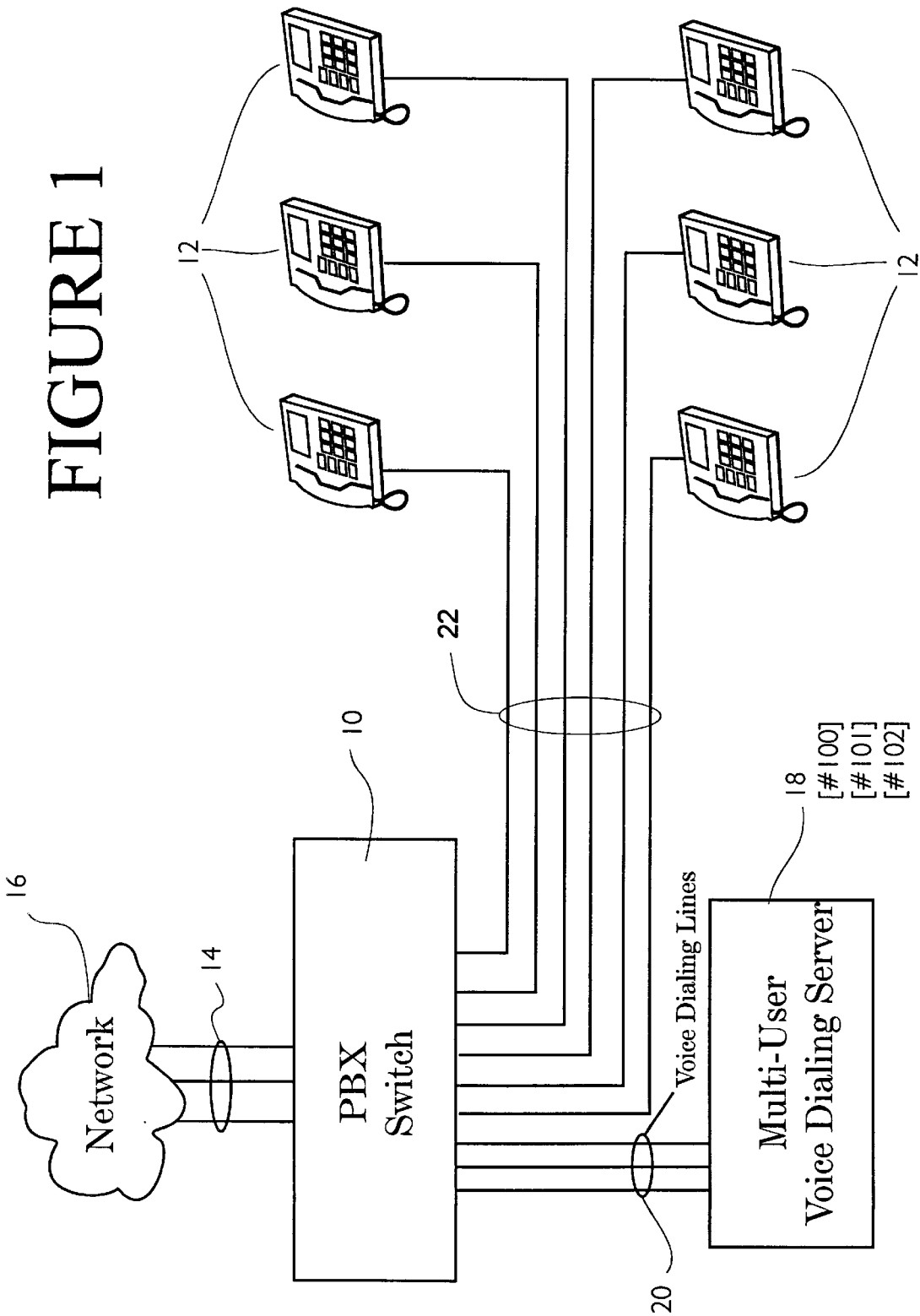
FIG. 1 is a system block diagram showing the multiuser voice dialing server connected to an existing public branch exchange (PBX) switch.

With the foregoing in mind, FIG. 1 depicts a conventional PBX switch 10 to which a plurality of telephone stations 12 are connected. PBX switch 10 is connected through a plurality of outside lines 14 to the telephone network infrastructure 16. Each of the individual stations 12 is connected to a separate extension or port, assigned a unique extension number. When calling internally from one station to another, the extension numbers may be dialed directly and the PBX switch connects the calling station to the designated receiving station. When placing calls to the telephone network 16 the full telephone number of the intended receiving station is dialed through the PBX switch.

The multiuser voice dialing server 18 of the invention is connected to one or more extension ports of the PBX switch 10, essentially in the same fashion as telephone stations 12 are connected. Preferably the voice dialing server is assigned an extension number different from the extension numbers assigned to the telephone stations 12. In this example the voice dialing server is assigned extension number #100. Although it is possible to implement the invention using only one extension line, the voice dialing server will handle more traffic from users if the server is connected through a plurality of lines to the PBX switch. In FIG. 1 server 18 is connected through three separate lines 20 to three separate extension ports of the PBX switch 10. These lines may be referred to as the voice dialing lines, although it will be appreciated that these lines are physically the same as the telephone station lines 22 that connect the telephone stations 12 to the PBX switch.

When multiple voice dialing lines are used, as illustrated here, one line will be assigned the primary extension number (in this case #100). The remaining lines are assigned other extension numbers. To make the system easy to use, the PBX switch 10 is programmed so that the primary extension (#100) is used by all users. When this extension is busy (in use by an earlier user) subsequent calls to the primary extension are routed to one of the unused remaining lines. If all voice dialing lines are busy when a user attempts to employ the voice dialing server, a busy signal will be received. This does not ordinarily occur because the voice dialing server is designed to drop out of the communication path once the desired number has been dialed. The system is designed to prompt the user for a name. It then looks up the telephone number associated with that name and dials it after receiving verbal confirmation from the user. The voice recognizer of the preferred embodiment is quite fast, hence each individual use of the system does not tie up a voice dialing extension for very long.

Figure 2:
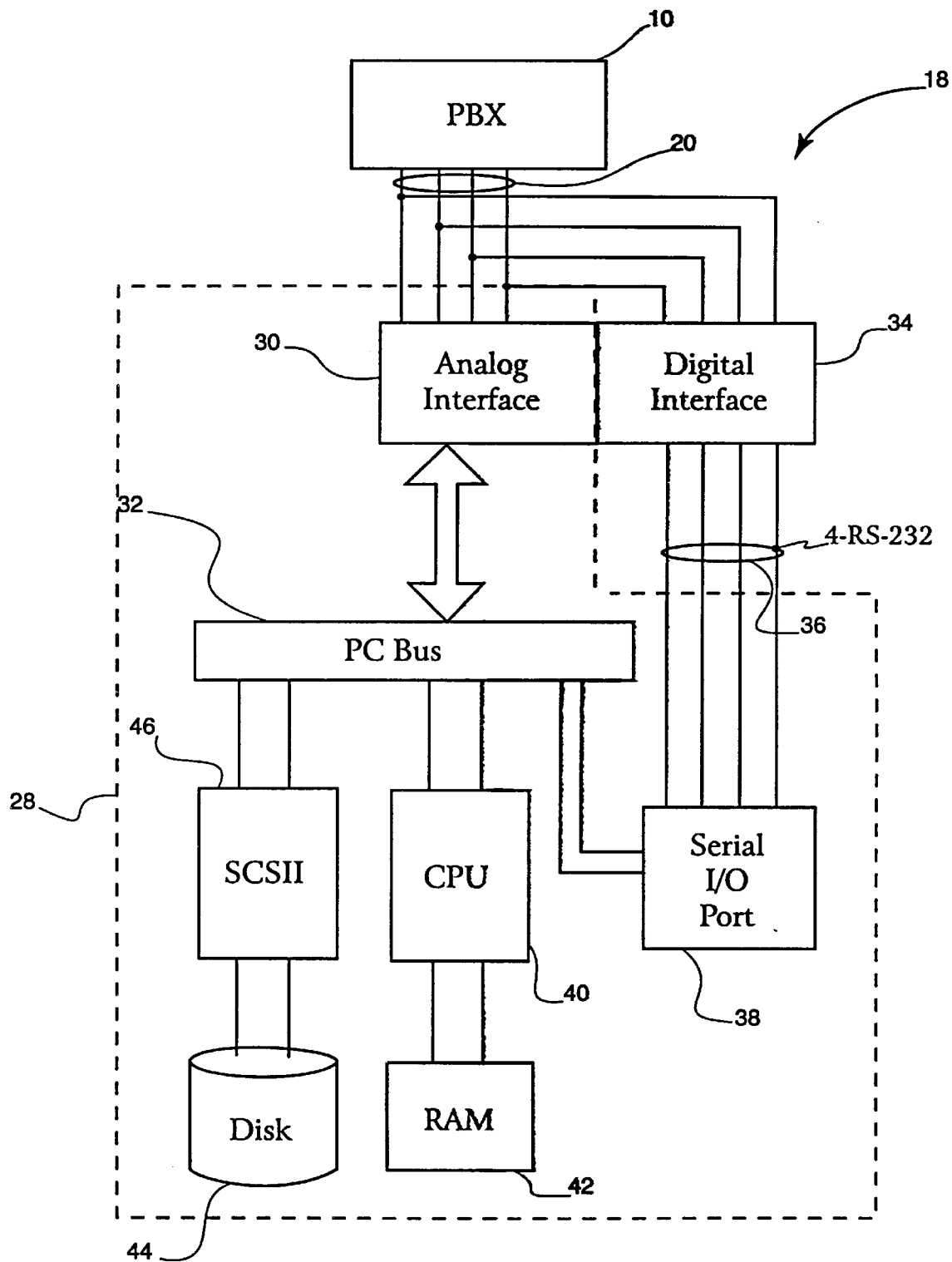
FIG. 2 is a block diagram of a first embodiment of the invention.

A first embodiment of the voice dialing server is illustrated in FIG. 2. In FIG. 2 PBX switch 10 and the voice dialing lines 20 have been illustrated. The remaining components of the telephone system, as shown in FIG. 1, have been omitted from FIG. 2 to simplify the illustration. The voice dialing server can be implemented using a conventional personal computer, depicted diagrammatically at 28, that has been equipped with the voice dialing server software described more fully below. The voice dialing server embodiment of FIG. 2 uses an analog interface 30 that plugs into the PC bus 32 and has ports for connecting to voice dialing lines 20. An optional digital interface 34 may be connected through a plurality of RS-232 lines 36 to the serial ports 38 of computer 28. In this case there would be a digital line for each analog line. The digital interface is connected in parallel with the analog interface to the voice dialing lines 20. Computer 28 includes a central processing unit 40 and random access memory 42. These are coupled to PC bus 32 in conventional fashion. A disk drive 44 is used to store the multiuser phone number dictionaries, as well as the boot copy of the voice dialing server software. The voice dialing server software is loaded into RAM 42, where it is accessed by the CPU 40 during execution. Disk drive 44 may be coupled through any suitable interface such as a SCSI interface 46 to the PC bus 32.

The analog interface of this embodiment may be a model D41E voice board available from Dialogic. Analog interface 30 includes a digital signal processor (DSP) and a general purpose microprocessor. The interface is capable of handling all telephony signal and it performs DTMF (touchtone) detection and generation as well as audio/voice signal processing tasks. The D41E voice board from Dialogic supports four independent voice channels.

The digital interface 34 is a protocol converter that converts the digital control signals from PBX switch 10 into serial signals conforming to the telephony application programming interface (TAPI) protocol established by Microsoft Corporation. The digital interface 34 is optional. Essentially, it is provided to allow the voice dialing server to determine the user's extension number automatically. The TAPI protocol is used to employ a caller ID function that will tell the voice dialing server what extension the user is calling from. Knowing this extension allows the voice dialing server to automatically use the phone number dictionary that is preassigned to that caller's extension. Without the caller ID information, the voice dialing server will need to prompt the user to enter his or her extension in order to activate the correct phone number dictionary.

Figure 3:
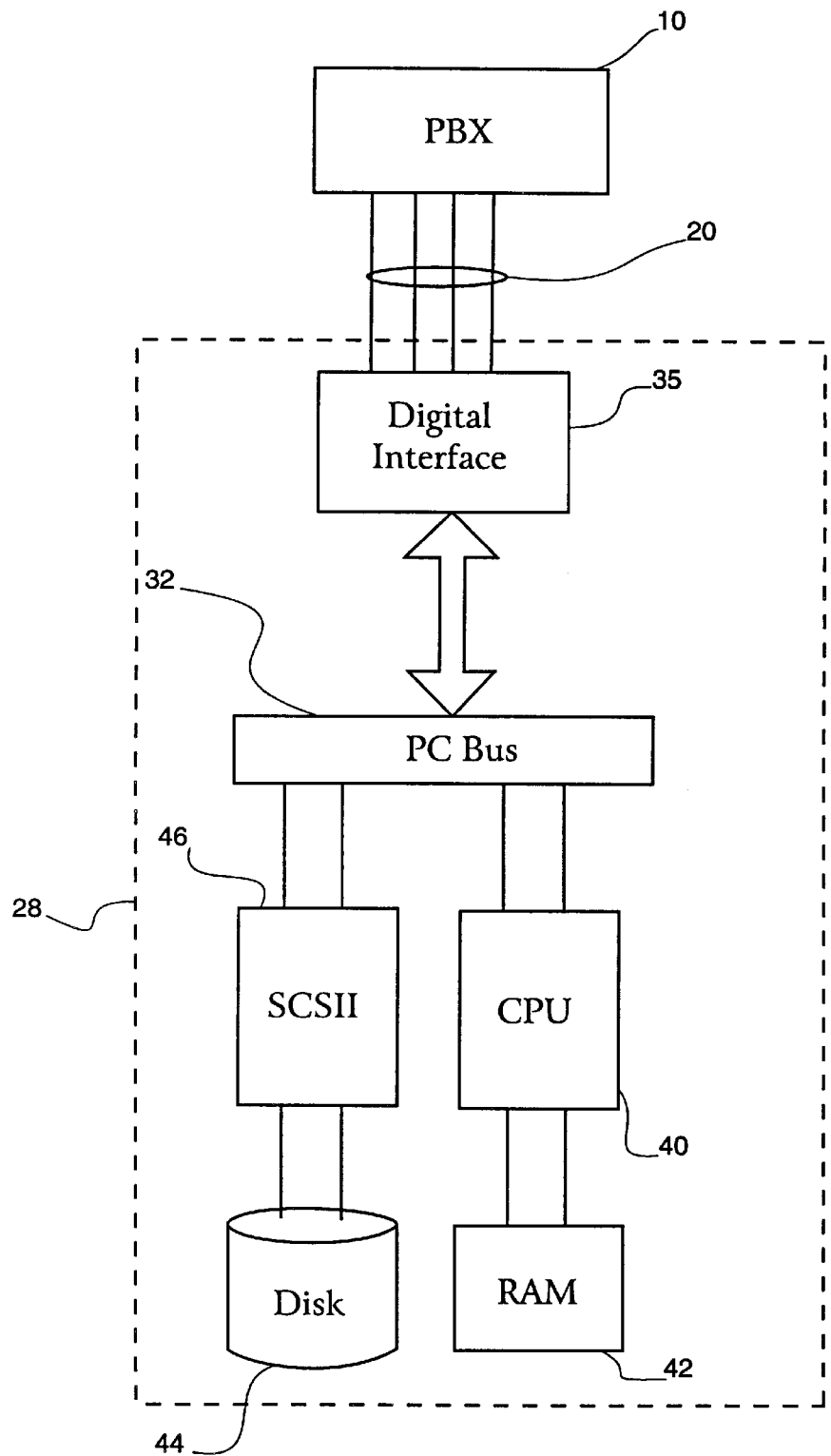
FIG. 3 is a block diagram of a second embodiment of the invention.

An alternate embodiment of the invention is depicted in FIG. 3. The embodiment of FIG. 3 is similar to that of FIG. 2 except that a dedicated digital interface 35 is used in place of analog interface 30 and digital interface 34. The dedicated digital interface is designed to directly connect with a predetermined make and model of PBX switch. The availability of such a dedicated digital interface 35 depends on the make and model of the PBX system. One such system is a Norstar PBX switch using a D/42-NS voice board as digital interface 35. The D/42-NS voice board is available from Dialogic. It functions similar to the D41E analog voice board described above, with additional digital control features built-in to interface with the Norstar PBX switch.

Figure 4:
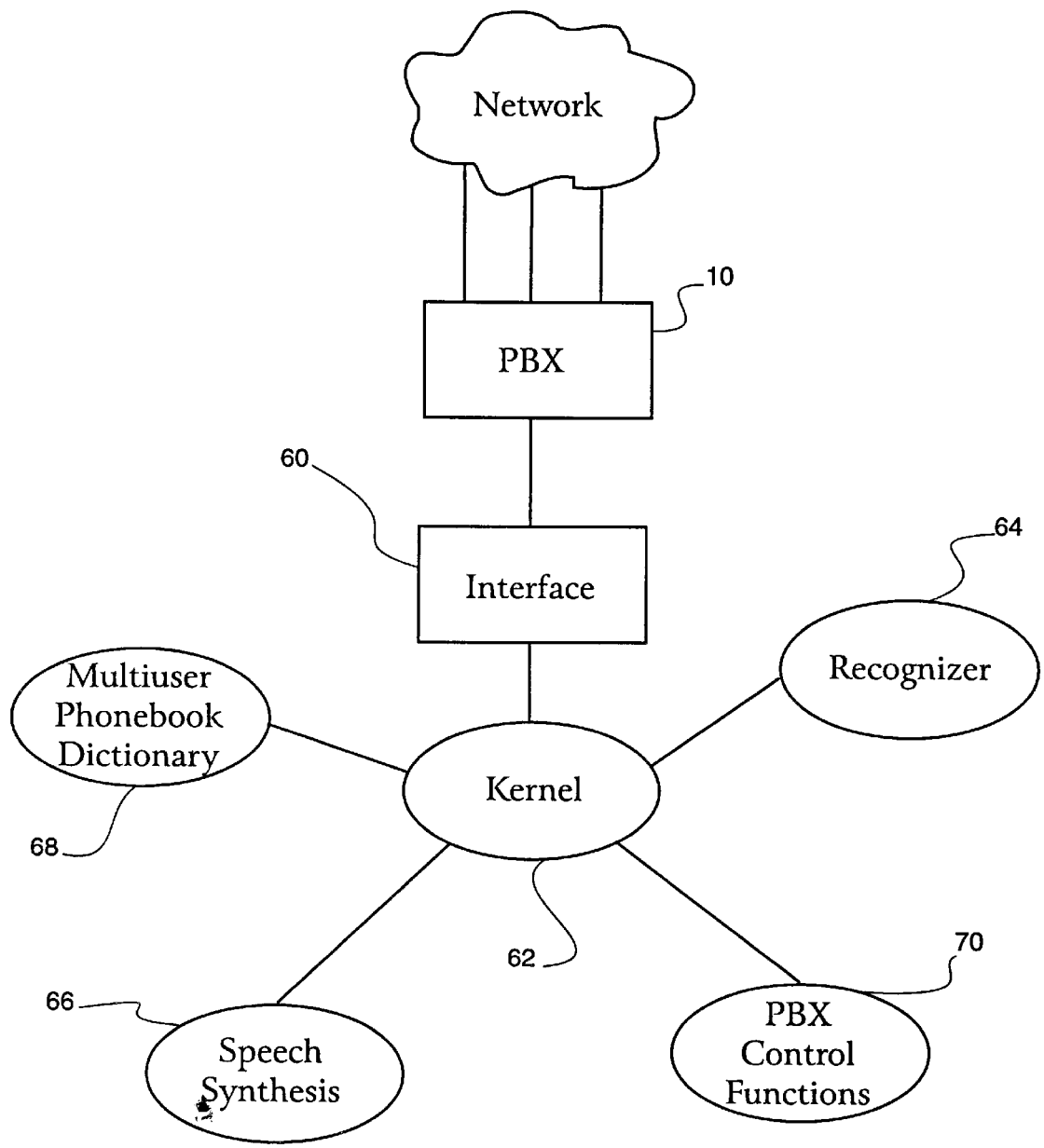
FIG. 4 is a entity relationship diagram showing how the major software subsystems are interfaced with the existing PBX switch.

As noted above, the presently preferred embodiments are implemented using a suitably programmed personal computer. FIG. 4 is a software entity relationship diagram showing the preferred software architecture that may be used to program the computer. Essentially, the software performs two functions: a voice interaction function and a PBX control function. From a voice and control signal standpoint, all communication with the PBX switch 10 is through an interface 60. The interface 60 supports both bidirectional voice communication and digital control information. The software of the preferred embodiment assumes that the voice channel has been digitized, hence the voice information communicated through interface 60 is digital audio data. If analog voice signals are present in the PBX system, they may be converted into digital signals through the analog interface hardware 30 (FIG. 2).

Connected to interface 60 is the kernel module 62 that oversees the operation of the server software. Attached to the kernel module 62 is the voice recognizer module 64 and speech synthesis module 66. The voice recognizer 64 works with a multiuser phone book dictionary 68 that contains all of the multiple users' personal phone book information, that is, the names and phone numbers that the users have entered by speaking the names and entering the numbers using DTMF tones entered through the touchtone keypad of the station handset. A subset of kernel module 62 are the PBX control functions 70. These are a stored set of digital control commands that cause the PBX 10 to execute certain control functions, in effect mimicking the control functions that a user of a telephone station handset might employ. The PBX control functions include the ability to place a call on hold and to request the PBX switch to set up a conference call. These commands are used during dialing of the selected phone number and thereafter to connect the user to the selected party. See pseudocode in the Appendix for details.

FIG. 5 is a flowchart showing how a user (at extension #214) might use the voice dialing server (at extension #100) to place an outside call using the voice dialer dictionary. Alongside the numbered boxes of the flowchart several reproductions of FIG. 1 have been illustrated, showing in bold lines how the switching actually occurs. The reader may wish to refer to these switching diagrams while reading the flowchart of FIG. 5.

The procedure begins at Step 90. The user at extension #214 lifts the handset of the telephone station and dials the extension of the voice dialing server (#100). The server answers the call and prompts the user for a name at Step 92. To effect this step the analog interface 30 (FIG. 2) or the dedicated digital interface 35 (FIG. 3) detects the ring signal and answers the incoming call. The extension number of the user's station is detected at this point for use in selecting the proper dictionary. The user may override by entering a different extension number. The incoming call event is transmitted through interface 60 (FIG. 4) to the kernel module 62. In response, the kernel module 62 employs the speech synthesis module 66 to prompt the user for a name and then monitors the voice channel (through interface 60) while employing the recognizer module 64.

Returning to FIG. 5, when the server recognizes the name spoken by the caller at Step 94, the server looks up the phone number to dial using the multiuser phone book dictionary 68 (FIG. 4). If the voice recognizer does not identify a name in the dictionary, or if the recognized name is below a predetermined reliability threshold the kernel module 62 may employs the speech synthesis module 66 to prompt the user to try again.

After recognizing the name and looking up the phone number, the kernel module 62 of the server prompts the user by repeating the name and asking the user to verify that the name is correct. The user may then either answer yes or no. If the answer is yes, the server will proceed to place the call. If the answer is no, the server will prompt the user to try again.

During these first three steps (Steps 90–94) the user's extension is connected through the PBX switch to the voice dialing server. This is shown in the switching diagram adjacent Steps 90–94. Bold lines are used to show the connection.

After obtaining the number to call and receiving the user's verification, the server then at Step 96 temporarily places the user on hold or in conference call mode. Then in Step 98 the server places a call through the PBX switch to the phone number that was determined during the lookup procedure. As illustrated at B the user's extension (#214) is temporarily placed on hold while the server is connected to an outside line via the PBX switch. Note that this technique allows the voice dialing server to connect to an outside line without the need to employ a separate inside extension. To effect this operation the kernel module 62 uses one of the PBX control functions 70 to send a request through interface 60 to the PBX. The request causes the PBX to place the user's extension on hold or in conference call mode and then causes the PBX switch to connect the server's extension (#100) to an outside line. This is done by mimicking the control signal commands that would be sent by a user of a telephone station handset to effect these same functions.

After establishing an outside line connection and receiving a dial tone, the server places the call by dialing the number that was looked up. The kernel 62 performs this operation by using the DTMF dialing capabilities of the analog interface 30 (FIG. 2) or the digital interface 35 (FIG. 3).

After dialing the desired number the server causes the PBX switch to conference in the user's extension at Step 100. As shown at C, the user's extension (#214) and the voice dialing server's extension (#100) are now both connected through a conference call to the outside line. Finally, in Step 102 the server drops out of the communication as illustrated at D. This leaves the user's extension (#214) connected to the outside line and frees up the server for its next use by another user.

Figure 6:
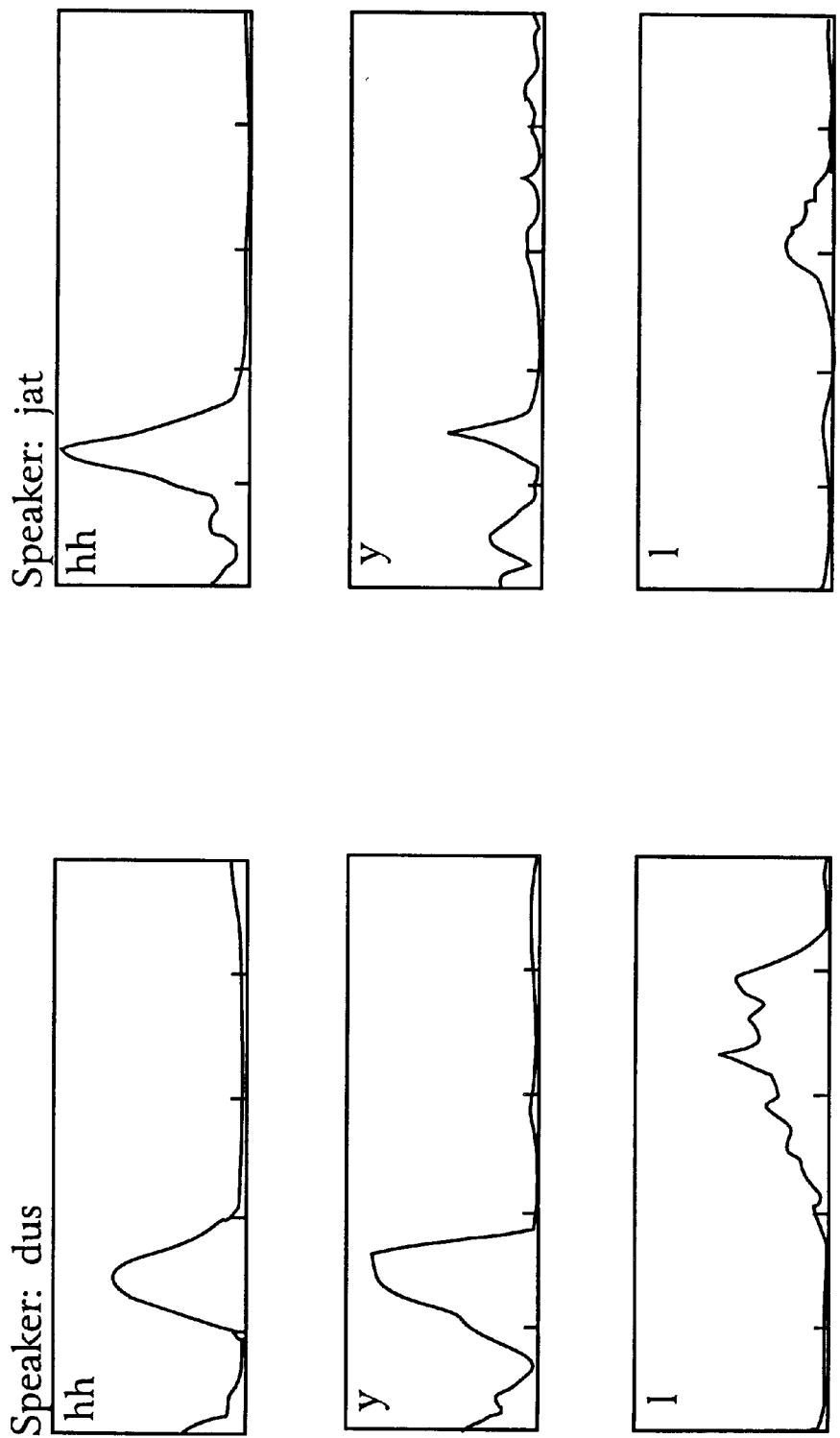
FIG. 6 is a phoneme similarity time series for the word "hill" spoken by two speakers.

The present invention employs a unique compact speech representation based on regions of high phoneme similarity values. As shown in FIG. 6, there is an overall consistency in the shape of the phoneme similarity time series for a given word. In FIG. 6 phoneme similarity time series for the word "hill" spoken by two speakers are compared. Although the precise wave shapes differ between the two speakers, the phoneme similarity data nevertheless exhibit regions of similarity between the speakers. Similar behavior is observed in the phoneme plausibility time series that has been described by Gong and Haton in "Plausibility Functions in Continuous Speech Recognition: The VINICS System," *Speech Communication,* Vol. 13, October 1993, pp. 187–196.

Conventional speech recognition systems match each input utterance to reference templates, such as templates composed on phoneme similarity vectors, as in the model speech method (MSM) of Hoshimi et al., "Speaker-Independent Speech Recognition Method Using Training Speech From a Small Number of Speakers," ICASSP, Vol. 1, pp. 469–472, 1992. In these conventional systems the reference speech representation is frame-based and requires a high data rate, typically 8 to 12 parameters every 10 to 20 milliseconds. The frame-by-frame alignment that is required with these conventional systems is computationally costly and makes this approach unsuitable for larger vocabularies, especially when using small hardware.

The present system uses a multistage word recognizer that is applied prior to a frame-by-frame alignment, in order to reduce the search space and to achieve real time performance improvements. The number of stages in the recognizer, as well as the computational complexity of each stage and the number of word candidates preserved at each stage, can be adjusted to achieve desired goals of speed, memory size and recognition accuracy for a particular application. The word recognizer uses an initial representation of speech as a sequence of multiple phoneme similarity values. However, the word recognizer further refines this speech representation to preserve only the interesting regions of high phoneme similarity. Referring to FIG. 7, the interesting regions of high phoneme similarity value are represented as high similarity regions. By representing the speech as features at a lower data rate in the initial stages of recognition, the complexity of the matching procedure is greatly reduced.

The multistage word recognizer also employs a unique scoring procedure for propagating and combining the scores obtained at each stage of the word recognizer in order to produce a final word decision. By combining the quasi-independent sources of information produced at each stage, a significant gain in accuracy is obtained.

The system's architecture features three distinct components that are applied in sequence on the incoming speech to compute the best word candidate.

Figure 8:
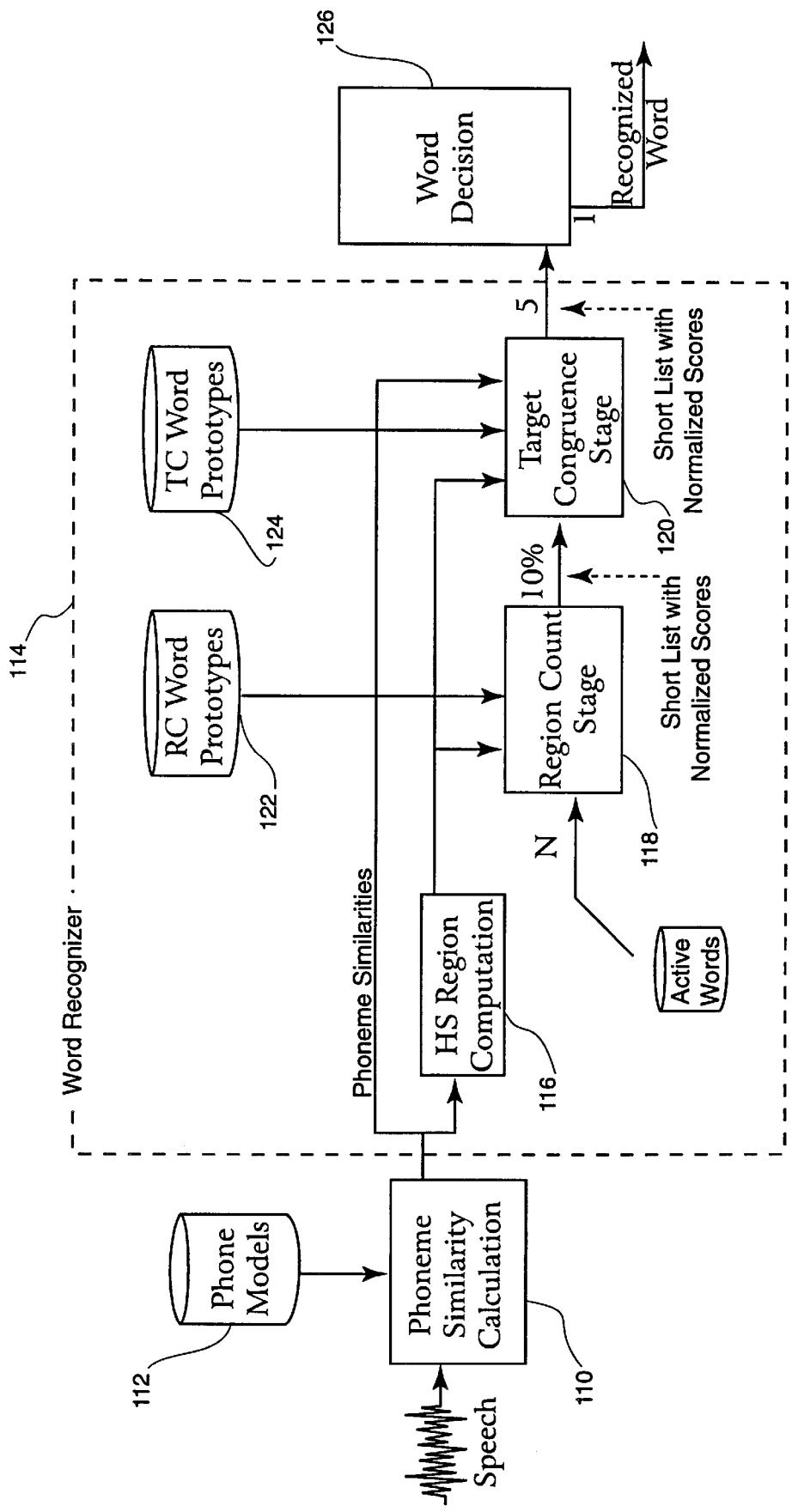
FIG. 8 is a block diagram of the presently preferred word recognizer system.

Referring to FIG. 8, an overview of the presently preferred system will be presented. The first component of the present system is a phoneme similarity front end 110 that converts speech signals into phoneme similarity time series. Speech is digitized at 8 kilohertz and processed by 10th order linear predictive coding (LPC) analysis to produce 10 cepstral coefficients every 100th of a second. Each block of 10 successive frames of cepstral coefficients is compared to 55 phoneme reference templates (a subset of the TIMIT phoneme units) to compute a vector of multiple phoneme similarity values. The block of analysis frames is then shifted by one frame at a time to produce a vector of phoneme similarity values each centisecond (each 100th of a second). As illustrated in FIG. 8, the phoneme similarity front end works in conjunction with a phone model database 112 that supplies the phoneme reference templates. The output of the phoneme similarity front end may be stored in a suitable memory for conveying the set of phoneme similarity time series so generated to the word recognizer stages.

The word recognizer stages, depicted in FIG. 8 generally at 114, comprise the second major component of the system. A peak driven procedure is first applied on the phoneme similarity time series supplied by front end 110. The peak driven procedure extracts High Similarity Regions (HS Regions). In this process, low peaks and local peaks of phoneme similarity values are discarded, as illustrated in FIG. 7. In the preferred embodiment regions are characterized by 4 parameters: phoneme symbol, height at the peak location and time locations of the left and right frames. Over our data corpus, an average of 60 regions per second of speech is observed. In FIG. 8 the high similarity region extraction module 116 performs the peak driven procedure. The output of the HS region extraction module is supplied to two different word recognizer stages that operate using different recognizer techniques to provide a short list of word candidates for the fine match final recognizer stage 126.

The first of the two stages of word recognizer 114 is the Region Count stage or RC stage 118. This stage extracts a short list of word candidates that are then supplied to the next stage of the word recognizer 114, the Target Congruence stage or TC stage 120. The RC stage 118 has an RC word prototype database 122 that supplies compact word representations based on the novel compact speech representation (regions of high phoneme similarity values) of the invention. Similarly, the TC stage 120 also includes a TC word prototype database 124 that supplies a different compact word representation, also based on the compact speech representation of the invention. The TC stage provides a more selective short list of word candidates, essentially a further refinement of the list produced by the RC stage 118.

The word decision stage 126, the final major component of the present system, selects the word with the largest score from the short list supplied by TC stage 120.

Region Count Modeling

The RC stage 118 of word recognizer 114 represents each reference word with statistical information on the number of HS regions over a predefined number of time intervals. The presently preferred embodiment divides words into three equal time intervals in which each phoneme interval is described by (1) the mean of the number of HS regions occurring in that interval and (2) a weight that is inversely proportional to the square of the variance, which indicates how reliable the region count is. Specifically for a score normalized between 0 and 100, the weight would be $100/(variance^2+2)$. These parameters are easily estimated from training data. In the currently preferred implementation, each word requires exactly 330 parameters, which corresponds to two statistics, each over three intervals each comprising 55 phoneme units (2 statistics×3 intervals×55 phoneme units).

Region count modeling was found to be very effective due to its fast alignment time (0.33 milliseconds per test word on a Sparc10 workstation) and its high top 10% accuracy.

The region count prototype is constructed as follows. A first utterance of a training word or phrase is represented as time-dependent phoneme similarity data. In the presently preferred embodiment each utterance is divided into N time intervals. Presently each utterance is divided into three time intervals, with each time interval being represented by data corresponding to the 55 phonemes. Thus the presently preferred implementation represents each utterance as a 3×55 vector. In representing the utterance as a 3×55 vector, each vector element in a given interval stores the number of similarity regions that are detected for each given phoneme. Thus if three occurrences of the phoneme "ah" occur in the first interval, the number 3 is stored in the vector element corresponding to the "ah" phoneme.

An inductive or iterative process is then performed for each of the successive utterances of the training word or phrase. Specifically, each successive utterance is represented as a vector like that of the first utterance. The two vectors are then combined to generate the vector sum and the vector sum of the squares. In addition, a scalar count value is maintained to keep track of the current number of utterances that have been combined.

The process proceeds inductively or iteratively in this fashion, each new utterance being combined with the previous ones such that the sum and sum of squares vectors ultimately represent the accumulated data from all of the utterances.

Once all training utterances have been processed in this fashion the vector mean and vector variance are calculated. The mean vector is calculated as the sum vector divided by the number of utterances used in the training set. The vector variance is the mean of the squares minus the square of the means. The mean and variance vectors are then stored as the region count prototype for the given word or phrase. The same procedure is followed to similarly produce a mean and variance vector for each of the remaining words or phrases in the lexicon.

When a test utterance is compared with the RC prototype, the test utterance is converted into the time dependent phoneme similarity vector, essentially in the same way as each of the training utterances were converted. The Euclidean distance between the test utterance and the prototype is computed by subtracting the test utterance RC data vector from the prototype mean vector and this difference is then squared. The Euclidean distance is then multiplied by a weighting factor, preferably the reciprocal of the prototype variance. The weighted Euclidean distance, so calculated, is then converted into a scalar number by adding each of the vector component elements. In a similar fashion the weighting factor (reciprocal of the variance) is converted into a scalar number by adding all of the vector elements. The final score is then computed by dividing the scalar distance by the scalar weight.

The above process may be repeated for each word in the prototype lexicon and the most probable word candidates are then selected based on the scalar score.

Target Congruence Modeling

The second stage of the word recognizer represents each reference word by (1) a prototype which consists of a series of phoneme targets and (2) by global statistics, namely the average word duration and the average "match rate," which represents the degree of fit of the word prototype to its training data. In the presently preferred embodiment targets are generalized HS regions described by 5 parameters:

1. phoneme symbol;
2. target weight (percentage occurrence in training data);
3. average peak height (phoneme similarity value);
4. average left frame location;
5. average right frame location.

Word prototypes are automatically created from the training data as follows. First, HS regions are extracted from the phoneme similarity time series for a number of training speakers. The training data may be generated based on speech from a plurality of different speakers or it may be based on multiple utterances of the same training words by a single speaker. Then, for each training utterance of a word, reliable HS regions are computed by aligning the given training utterance with all other utterances of the same word in the training data. This achieves region-to-region alignment.

For each training utterance the number of occurrences (or probability) of a particular region is then obtained. At that time, regions with probabilities less than a pre-established Reliability Threshold (typically 0.25) are found unreliable and are eliminated. The word prototype is constructed by merging reliably detected, high similarity regions to form targets. At the end of that process a target rate constraint (i.e. desired number of targets per second) is then applied to obtain a uniform word description level for all the words in the lexicon. The desired number of targets per second can be selected to meet system design constraints such as the ability of a given processor to handle data at a given rate. By controlling the target rate a reduction in the number of targets is achieved by keeping only the most reliable targets. Once the word prototype has been obtained in this fashion, the average match rate and average word duration are computed and stored as part of the word prototype data.

The number of parameters needed to represent a word depends on the average duration of the word and on the level of phonetic detail that is desired. For a typical 500 millisecond word at 50 targets per second, the speech representation used by the presently preferred embodiment employs 127 parameters, which correspond to 5 values per target×50 targets per second×0.5 seconds+2 global statistics (average match rate and average word duration).

Figure 9:
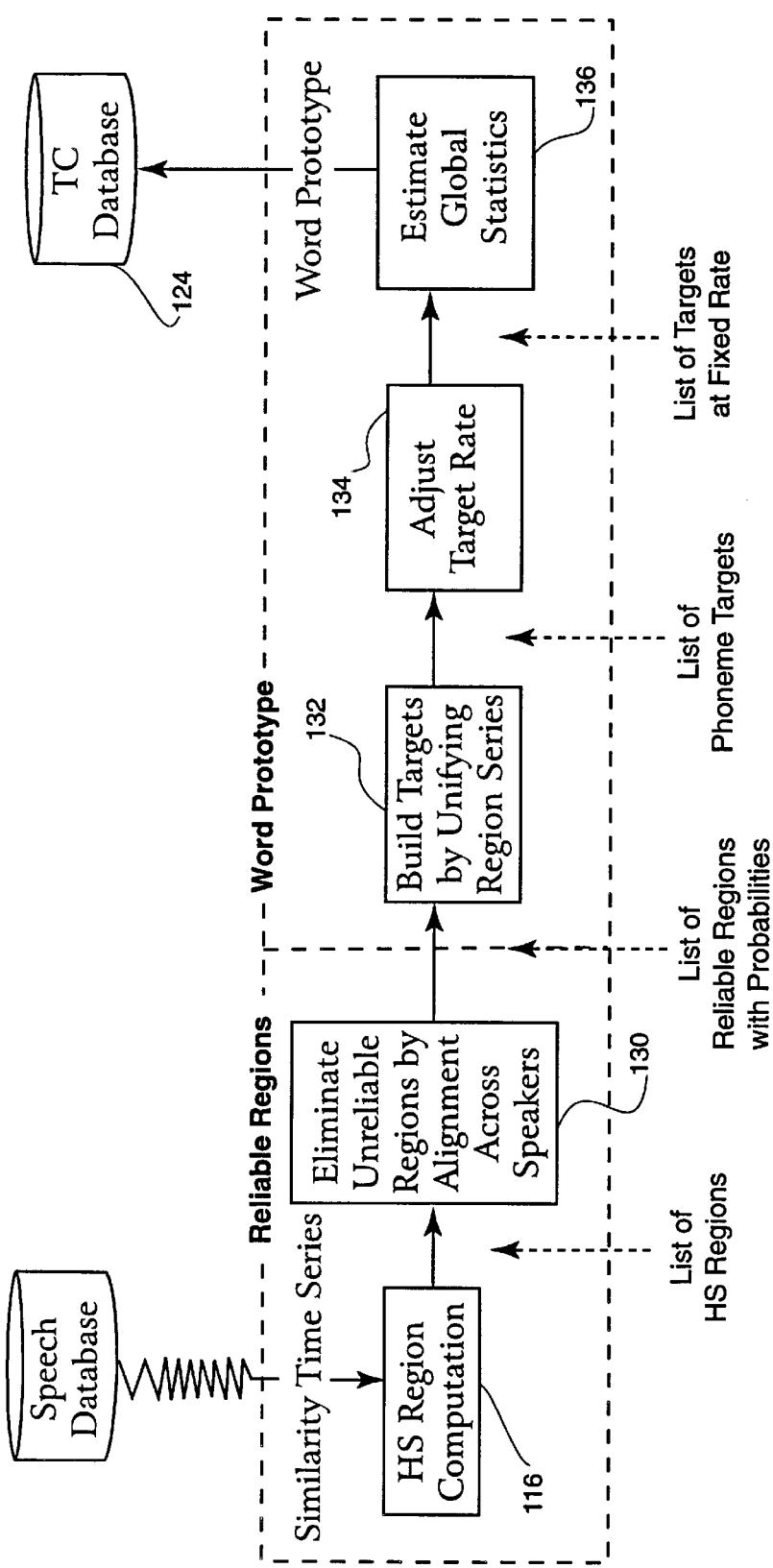
FIG. 9 is a block diagram illustrating the target congruence word prototype training procedure.

FIG. 9 illustrates the word prototype training procedure by which the TC word prototype database 124 is constructed. The RC word prototype database 122 is constructed by similar, but far simpler process, in that only the presence or absence of an HS region occurring with each of the three equal time intervals must be detected.

Referring to FIG. 9, the HS Region Computation Module 116 is used to convert the similarity time series from the speech database into a list of HS regions. The alignment module 130 operates on this list of HS regions to eliminate unreliable regions by alignment across speakers. Again, the process can be performed across a plurality of different speakers or across a plurality of utterances by the same speaker.

Next the list of reliable regions, together with the associated probabilities of detecting those regions is passed to the target building module 132. This module builds targets by unifying the region series to produce a list of phoneme targets associated with each word in the database. This list of phoneme targets is then supplied to a module 134 that adjusts the target rate by applying the target rate constraint. The target rate constraint (the desired number of targets per second) may be set to a level that achieves the desired target rate. After adjusting the target rate a statistical analyzer module 136 estimates the global statistics (the average match rate and the average word duration) and these statistics along with the list of targets at the selected rate are then stored as the TC word prototype database 124.

Word Recognition

Given an active lexicon of N words, the region count stage is first applied to produce a short list of word candidates with normalized scores. A weighted Euclidean distance is used to measure the degree of fit of a test word X to a reference word P (in RC format as supplied by the RC word prototype database). Specifically, in the current implementation the weighted Euclidean distance is defined as $$D_{RC}(X,P) = \sum_{i=1}^{3}\sum_{j=1}^{55}(x_{ij}-p_{ij})^2 w_{ij} \bigg/ \sum_{i=1}^{3}\sum_{j=1}^{55} w_{ij}$$

where $x_{ij}$ is the number of HS regions in time interval I for phoneme j, where $p_{ij}$ is the corresponding average number of HS regions estimated on training data, and where $w_{ij}$ is the corresponding weight. The N/10 highest scoring word prototypes are preserved as word candidates and their scores (weighted Euclidean distances) are normalized by dividing each individual score by the highest score. This defines a normalized score $S_{RC}$ for each word. Normalized scores range from 0 to 1 and are dimensionless, making it possible to combine scores resulting from different scoring methods.

The target congruence stage is then applied on each word candidate selected by the RC stage. A region-to-target alignment procedure is used to produce a congruence score between the test word and a given word reference (in TC format as supplied by the TC word prototype database). The congruence score of a matched target CGmatch, that is, the alignment found between target t of the prototype and region r of the test word, is defined as $$CG_{match}(t,r) = \min(A_t|A_r, A_r|A_t)$$

where $A_t$ and $A_r$ respectively represent the target's area and the aligned region's area in the time similarity plane.

The congruence score of an unmatched target CGunmatch is computed in the same way, using an estimate for the area $A_r$ of the missing HS region. The estimated area $A_r$ is computed as the area under the similarity curve for the target's phoneme label, between the projected locations of the target's left and right frames.

The word congruence score is computed as the weighted sum of congruence scores for all the targets, divided by the sum of their weights. Normalized congruence scores STC are computed by dividing the individual congruence scores by the highest congruence score. The final score output by the word recognizer is a combination of the information obtained at each recognizer stage. In the presently preferred embodiment the final score output of the recognizer is:

$$S_{Hypo} = (S_{RC}+S_{TC})/2$$

The recognized word is the one with the highest $S_{Hypo}$ value.

---

APPENDIX

Notes:

The function TransferCallDesklab(Number) does the transfer to an inside extension by calling the PBX function "feature 7 0" followed by the APPENDIX
-continued extension number after a hookflash. Then the line is released.
The function TransferExternalCallDeskLab(Number) does the transfer outside. In the program a message is played, then the user is put on hold (by sending "feature 7 9", then the program gets an external line, then a conference call is established, the phone number is dialed, and the line is released.
Pseudocode:

```
int TransferCallDeskLab(Number)
char *Number;
{
    int LastRet;
    int Ret;
    ghookflash((*DskLab).Desc,500);
    gdial((*DskLab).Desc,"*70",1);
    gdial((*DskLab).Desc,Number,1);
    gphone_hookswitch((*DskLab).Desc,1);
    while (Ret=gphone_status((*DSkLab).Desc,&LastRet)
        !=G_ONHOOK)
        {
            sleep(1);
        }
}
int TransferExternalCallDeskLab (phoneNumber)
            char *phoneNumber;
{
    int LastRet;
    int Ret;
    int lastatus=-199, rtnval;
    int thereIsProblem,
        state,
        new_state,      last_state;
extern char *G_PhoneStatus[ ];
    char msg[ ] = "Calling";
    /* Play message while transfering */
    ALIPlayMessage(msg);
    esleep(1,1000);
    printf("Putting calling line on hold . . .");fflush(stdout);
    ghookflash((*DskLab).Desc,500);
    gdial((*DskLab).Desc,"*79",1);
    printf("done!\n"); fflush(stdout);
    printf("Getting external line . . . "); fflush(stdout);
    gdial((*DskLab).Desc,"9",0);  /* obtain an external line */
    state = 0;
    do {
        esleep(0,1000);
        new_state = gphone_status((*DskLab).Desc,&last_state);
        if (state != new_state) {
                state = new_state;
                printf("state = %s\n",G_PhoneStatus[state]);
        }
        thereIsProblem = 0;
        switch (state) {
            case G_ONHOOK:  /* call disconnected -- strangely */
            case G_BUSY:    /* cannot get an outside line */
            case G_REORDER:
            case G_REORDER2: thereIsProblem = 1;
            default: break;
        }
    } while ( (state != G_DIALTONE ) &&
    (state != G_CONNECTED)
                && !thereIsProblem );
    printf("done!\n"); fflush(stdout);
    printf("Establishing Conference Call . . .");fflush(stdout);
    ghookflash((*DskLab).Desc,500);    gdial((*DskLab).Desc,"*3",1);
        ALIPlayMessage(msg);
        printf("Dialing %s . . .", phoneNumber); fflush(stdout);
        gdial((*DskLab).Desc,phoneNumber,1);
        printf("done!\n"); fflush(stdout);
        state = 0;
        do {
            esleep(0,10000);           /* ¼ second sleep */
            new_state = gphone_status((*DskLab).Desc,&last_state);
            if (state != new_state) {
                state = new_state;
                printf("state =
                    %s\n",G_PhoneStatus[state]);fflush(stdout);
            }
```

APPENDIX

```
        thereIsProblem = 0;
    switch (state) {
        case G_ONHOOK:   /* call disconnected -- strangely */
        case G_BUSY:     /* cannot get an outside line */
        case G_REORDER:
        case G_REORDER2: thereIsProblem = 1;
        default: ;
        }
    } while ((state !=G_CONNECTED ) && (state != G_BUSY) &&
!thereIsProblem);
    printf("Putting phone ONHOOK . . .");fflush(stdout);
    gphone_hookswitch((*DskLab).Desc,G_ONHOOK);
    while ((Ret=gphone_status((*DskLab).Desc,&LastRet))
    !=G_ONHOOK)
    {
        sleep(1);
    }
    printf("done!\n"); fflush(stdout);
}
```

What is claimed is:

1. A voice dialing server for coupling to a telephone system of the type that provides call switching among a plurality of telephone ports, comprising:

an interface for connection to at least a first one of said telephone ports to support transmission of voice signals and telephone system control information;

a speech processing module coupled to said interface for (a) answering a call placed to the voice dialing server by a user, (b) processing speech input from the user corresponding to a selected party to be called and (c) looking up a phone number of a selected party;

a control module coupled to said interface and to said speech processing module for issuing control information to said telephone system to place the user in communication with the selected party;

said control module having a first mode of operation whereby said user is placed in communication with the selected party by (a) acquiring a second port and dialing the requested party before the user is connected to said second port, and thereafter (b) connecting the user to said second port;

said control module having a second mode of operation whereby said user is placed in communication with the selected party by (a) acquiring a second port and placing said telephone system in conference call mode to connect the user to said second port, and thereafter (b) dialing the requested party while the user is connected to said second port;

said control system employing either said first mode or said second mode based on the phone number of the selected party.

2. The server of claim 1 wherein said speech processing module supports a plurality of user phone number dictionaries.

3. The server of claim 2 wherein said control module includes system for communicating with said telephone system to determine the identity of the user's extension and for using this identity to select one of said plurality of phone number dictionaries for use by said speech processing module.

4. The server of claim 2 wherein said control module includes system responsive to keyed user input for selecting one of said plurality of phone number dictionaries for use by said speech processing module.

5. The server of claim 1 wherein said control module is sues control information to said telephone system to place the user's call to the voice dialing server on hold while establishing communication via said second port.

6. The server of claim 1 wherein said control module issues control information to said telephone system to transfer the user's call to the voice dialing server to another extension on said telephone system.

7. The server of claim 1 wherein said control module is implemented on a computer having a bus and said interface comprises an analog interface coupled to the bus of said computer.

8. The server of claim 1 wherein said control module is implemented on a computer having at least one serial port and said interface comprises an analog interface coupled to the serial port of said computer.

9. The server of claim 1 wherein said control module is implemented on a computer having a bus and said interface comprises an digital interface coupled to the bus of said computer.

10. The server of claim 1 where in said speech processing module includes a speech recognizer that represents speech as high phoneme similarity values.

11. The server of claim 1 wherein said speech processing module includes a speech recognizer comprising a word recognizer that employs a region count stage that extracts a list of word candidates based on regions of high phoneme similarity values.

12. The server of claim 1 wherein said speech processing module includes a speech recognizer comprising a word recognizer that employs:

a region count stage that extracts a first list of word candidates based on regions of high phoneme similarity values, and a target congruence stage that extracts a second list of word candidates from said first list based on regions of high phoneme similarity values.

* * * * *